(12) United States Patent
Choi et al.

(10) Patent No.: US 11,124,020 B2
(45) Date of Patent: Sep. 21, 2021

(54) CONSTANT VELOCITY JOINT ASSEMBLY INTEGRATED WITH WHEEL HUB UNIT

(71) Applicants: Hyundai Motor Company, Seoul (KR); Kia Motors Corp., Seoul (KR); Hyundai Wia Corporation, Changwon-si (KR)

(72) Inventors: Won Jun Choi, Yangsan-si (KR); Hee Il Kim, Suwon-si (KR); Kong Sup Jung, Hwaseong-si (KR); Ki Dong Park, Suwon-si (KR); Chang Hee Jeong, Yongin-si (KR); Bum Jae Lee, Yongin-si (KR)

(73) Assignees: Hyundai Motor Company, Seoul (KR); Kia Motors Corp., Seoul (KR); HYUNDAI WAI Corporation, Changwon-si (KR)

( * ) Notice: Subject to any disclaimer, the term of this patent is extended or adjusted under 35 U.S.C. 154(b) by 466 days.

(21) Appl. No.: 16/111,506

(22) Filed: Aug. 24, 2018

(65) Prior Publication Data

US 2019/0344618 A1    Nov. 14, 2019

(30) Foreign Application Priority Data

May 14, 2018  (KR) .................. 10-2018-0054792

(51) Int. Cl.
*B60B 27/00* (2006.01)
*F16C 19/16* (2006.01)
*F16D 3/224* (2011.01)

(52) U.S. Cl.
CPC ...... *B60B 27/0042* (2013.01); *B60B 27/0005* (2013.01); *B60B 27/0094* (2013.01); *F16C 19/16* (2013.01); *B60B 27/0078* (2013.01); *B60B 2380/12* (2013.01); *B60B 2380/60* (2013.01); *B60B 2380/73* (2013.01); *B60B 2900/111* (2013.01); *B60B 2900/112* (2013.01); *F16C 2326/02* (2013.01); *F16D 3/224* (2013.01)

(58) Field of Classification Search
CPC ........... B60B 27/0042; B60B 27/0005; B60B 27/0015; B60B 27/0036; B60B 27/0078; B60B 27/0094; F16C 19/16; F16D 3/224
See application file for complete search history.

(56) References Cited

U.S. PATENT DOCUMENTS 4,417,643 A   11/1983  Guimbretiere
4,473,129 A    9/1984  Guimbretiere
(Continued)

FOREIGN PATENT DOCUMENTS

JP    2003-287051 A    10/2003
JP       3932630 B2     6/2007
(Continued)

*Primary Examiner* — Jason R Bellinger
(74) *Attorney, Agent, or Firm* — Morgan, Lewis & Bockius LLP (SF)

(57) ABSTRACT

A constant velocity joint assembly integrated with a wheel hub device may include an internal race coupled to an end portion of a driveshaft, a plurality of joint balls held in the internal race, and a hub housing accommodating and coupling the internal race holding the joint balls therein, with a bearing coupled to an external circumferential surface thereof, the hub housing provided as an external race of a constant velocity joint and the wheel hub device.

12 Claims, 7 Drawing Sheets

(56) References Cited

U.S. PATENT DOCUMENTS

| | | |
|---|---|---|
| 4,621,700 A | 11/1986 | Merkelbach |
| 5,762,559 A | 6/1998 | Jacob et al. |
| 5,911,425 A | 6/1999 | Hofmann et al. |
| 6,190,262 B1 * | 2/2001 | Miyazaki ................ F16D 3/223 464/178 |
| 6,280,336 B1 | 8/2001 | Ouchi et al. |
| 6,299,542 B1 | 10/2001 | Ouchi et al. |
| 6,368,223 B1 | 4/2002 | Sone et al. |
| 2008/0093914 A1 | 4/2008 | Mabuchi et al. |
| 2012/0313425 A1 | 12/2012 | Siebeneick et al. |
| 2017/0282644 A1 | 10/2017 | Sguotti et al. |

FOREIGN PATENT DOCUMENTS

| | | |
|---|---|---|
| KR | 10-0592090 B1 | 6/2006 |
| KR | 10-2015-0066940 A | 6/2015 |
| WO | WO 2008/122523 A1 | 10/2008 |

\* cited by examiner

FIG. 1

Outward direction ←    → Inward direction

CONSTANT VELOCITY JOINT ASSEMBLY INTEGRATED WITH WHEEL HUB UNIT

CROSS REFERENCE TO RELATED APPLICATION(S)

The present application claims priority to Korean Patent Application No. 10-2018-0054792, filed on May 14, 2018, the entire contents of which is incorporated herein for all purposes by this reference.

BACKGROUND OF THE INVENTION

Field of the Invention

The present invention relates generally to a constant velocity joint assembly integrated with a wheel hub unit.

Description of Related Art

Generally, joints for use in vehicles are couplings that serve to transmit rotation power (torque) between drive/driven shafts having different angles of drive axes. A Hooke's joint, a flexible joint, and the like are used between drive/driven shafts having a small power transmission angle, while a constant velocity joint is used between drive/driven shafts having a large power transmission angle.

Since the constant velocity joint can transmit power at constant speed even when a driveshaft and a driven shaft are misaligned at a greater angle, the constant velocity joint is used mainly in an axle shaft of a front drive vehicle in a type of independent suspension.

In a conventional structure of a drive wheel, a wheel hub device and a constant velocity joint are separately manufactured, an external race of the constant velocity joint is spline-coupled through the wheel hub device, and hub nuts are fastened to an end portion of the external race, forming an assembly of the constant velocity joint and the wheel hub device.

However, the conventional configuration in which the separate constant velocity joint and wheel hub device are assembled through the spline coupling and the fastening by hub nuts have problems in that weight and thus manufacturing cost increase due to an increase in the number of parts, backlash occurs due to the spline coupling, and quality degradation arises due to unfastening of the hub nuts.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a constant velocity joint assembly integrated with a wheel hub device, providing high strength structure while reducing weight and cost thereof through reduction in the number of parts.

In various aspects of the present invention, there is provided a constant velocity joint assembly integrated with a wheel hub device, the assembly including: an internal race coupled to an end portion of a driveshaft; a plurality of joint balls held in the internal race; and a hub housing accommodating and coupling the internal race holding the joint balls therein, with a bearing coupled to an external circumferential surface thereof, the hub housing provided as an external race and the wheel hub device, wherein a knuckle carrier is fixed to a circumferentially-external ring of the bearing, and a multiple-row of bearing balls is assembled onto the circumferentially-external ring such that the rows of bearing balls are accommodated on the hub housing and a circumferentially-internal ring of the hub bearing, respectively, and wherein a lock nut is coupled to the hub housing to apply a preload to the circumferentially-internal ring.

The constant velocity joint assembly may further include a lock ring fixedly coupled to the hub housing while abutting against a side surface of the lock nut, and a plurality of bolts bolted onto the lock nut through the lock ring.

The hub housing may include a hub portion having grooves into which the joint balls are inserted, the hub portion being positioned within a whole length (A) of the hub housing, wherein at least the rows of ball bearings, the lock nut, and a boot are disposed within the whole length (A) of the hub housing, wherein the center of the internal race is positioned in the hub portion, and wherein a correlation between the whole length (A) of the hub housing and a central length (B) of the internal race satisfies a condition of '$1.25 \leq A/B \leq 1.4$'.

A correlation between a pitch circle diameter (PDC) C of the bearing ball and a pitch circle diameter D of the joint balls may satisfy a condition of '$1.7 \leq C/D \leq 1.9$'.

A correlation between a pitch circle diameter (PDC) D of the joint balls and a diameter E of the driveshaft may satisfy a condition of '$2.15 \leq D/E \leq 2.35$'.

According to the exemplary embodiments of the present invention, the single hub housing is configured as both the external race of the constant velocity joint and the wheel hub device, having effects of reducing weight and manufacturing cost thereof through reduction in the number of parts, of eliminating coupling noise and backlash occurring upon power transmission, and of providing high strength structure through the integrated structure of the external race of the constant velocity joint and the wheel hub device.

Furthermore, the configuration in which the center of the internal race is positioned within the whole length of the hub housing substantially reduces the size of the constant velocity joint in the horizontal direction of a vehicle, being advantageous in terms of packaging thereof.

Still Furthermore, the configuration satisfying a condition of '$1.25 \leq A/B \leq 1.4$' has the effects of securing a sufficient spoke thickness of the hub portion and thus maintaining the strength of the hub housing, of maintaining a sufficient rotation angle of the driveshaft and thus improving steering performance.

Still Furthermore, the configuration satisfying a condition of '$1.7 \leq C/D \leq 1.9$' has the effects of securing a sufficient mounting space of bearing balls and sufficient strength of the bearing, and of providing sufficient durability through prevention of interference with peripheral parts.

Yet still Furthermore, the configuration satisfying a condition of '$2.15 \leq D/E \leq 2.35$' has the effects of satisfying the strength of the driveshaft and allowable strength of the constant velocity joint.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, exemplary embodiments of the present invention will be described in detail with reference to the accompanying drawings.

As shown in FIGS. 1 to 4, a constant velocity joint assembly according to an exemplary embodiment of the present invention includes an internal race 10 coupled to an end portion of a driveshaft 1, a plurality of joint balls 20 fitted in the internal race 10, and a hub housing 40 into which the internal race 10 holding the joint balls 20 therein is fixedly inserted, with a bearing 30 coupled to an external circumferential surface thereof, provided as both an external race and a wheel hub device.

The driveshaft 1 is configured to transmit power to a wheel from an engine through a transmission.

The constant velocity joint is classified into a ball-type joint and a tripod-type joint. The internal race 10 and the joint balls 20 are components of the ball-type joint.

The hub housing 40 is configured as both the external race of the constant velocity joint and the wheel hub device configured for coupling a wheel and a knuckle carrier. Thus, the hub housing has advantages of a reduction in the number of parts, weight, and manufacturing cost, compared to the related art in which the external race of the constant velocity joint and the wheel hub device are separately fabricated and coupled together by a hub nut.

That is, in the conventional structure, the external race of the constant velocity joint and the wheel hub device are spline-coupled and fastened by the hub nut. Here, the spline coupling and the fastening by the hub nut cause problems including the occurrence of the connection noise and backlash, and unfastening of the hub nut.

On the other hand, according to an exemplary embodiment of the present invention, the hub housing 40 itself is configured as both the external race of the constant velocity joint and the wheel hub device, reducing the number of parts, weight, and manufacturing cost while eliminating the problems of the occurrence of connection noise and backlash, and the unfastening of the hub nut, which is advantageous in obtaining high strength structure.

The hub housing 40 includes a circular hub portion 41, which is open at both medial and lateral end portions thereof in a horizontal direction of a vehicle, the hub portion having, on an internal circumferential surface thereof, grooves 41a in which the joint balls 20 are accommodated, a housing portion 42 extending from the hub portion 41 towards a lateral side of a vehicle so that the lateral end portion of the hub portion 41 is accommodated therein, and a flange portion 43 radially enlarged from a lateral end portion of the housing portion 42 and around which a wheel disk 2 is coupled.

The number of the grooves 41a is the same as that of the joint balls 20. The groove 41a extends in the horizontal direction of a vehicle.

In an exemplary embodiment of the present invention, the constant velocity joint assembly further includes a boot which is connected between the medial open end portion of the hub portion 41 and an end side of the driveshaft 1, and a hub cap 60 detachably coupled to the lateral open end portion of the hub portion 41.

Here, since the driveshaft 1 may be inserted and assembled from the outside toward the inside of a vehicle through the lateral open end portion of the hub portion 41, so that the assembly of the driveshaft 1 may be facilitated.

An internal space of the hub portion 41 is hermetically sealed by the boot 50 and the hub cap 60, preventing the leakage of grease and the intrusion of foreign substance.

In an exemplary embodiment of the present invention, the constant velocity joint assembly further includes a wheel guide 70 coupled to the flange portion 43 of the hub housing 40.

The wheel guide 70 is press-fitted in the flange portion 43, so that, when the wheel disk 2 is coupled to the flange portion 43, the disk is centrally guided and fitted around the wheel guide.

The bearing 30 includes a bearing ball 31 including external balls 31a and internal balls 31b provided on an external circumferential surface of the housing portion 42 at lateral and medial sides in the horizontal direction of a vehicle, a circumferentially-internal ring 32 supporting and holding the internal balls 31b, and a circumferentially-external ring 33 covering both the external and internal balls 31a and 31b and to which a knuckle carrier 3 is coupled.

The external ball 31a is fixedly held by a ball support 44 integrally formed with the housing portion 42.

That is, the knuckle carrier 3 is fixed to the circumferentially-external ring 33 of the bearing 30, and the internal and external balls 31b and 31a of the bearing ball 31 are assembled to the circumferentially-external ring 33 such that the internal and external balls 31b and 31a are accommodated on the circumferentially-internal ring 32 of the bearing and the hub housing 40, respectively.

Thus, according to various aspects of the present invention, since a separate component, such as a circumferentially-internal ring portion, for supporting the external balls 31a is not required, there are advantages of a reduction in the number of parts and manufacturing processes, weight, and manufacturing cost, contributing to an improvement of productivity.

Figure 1:
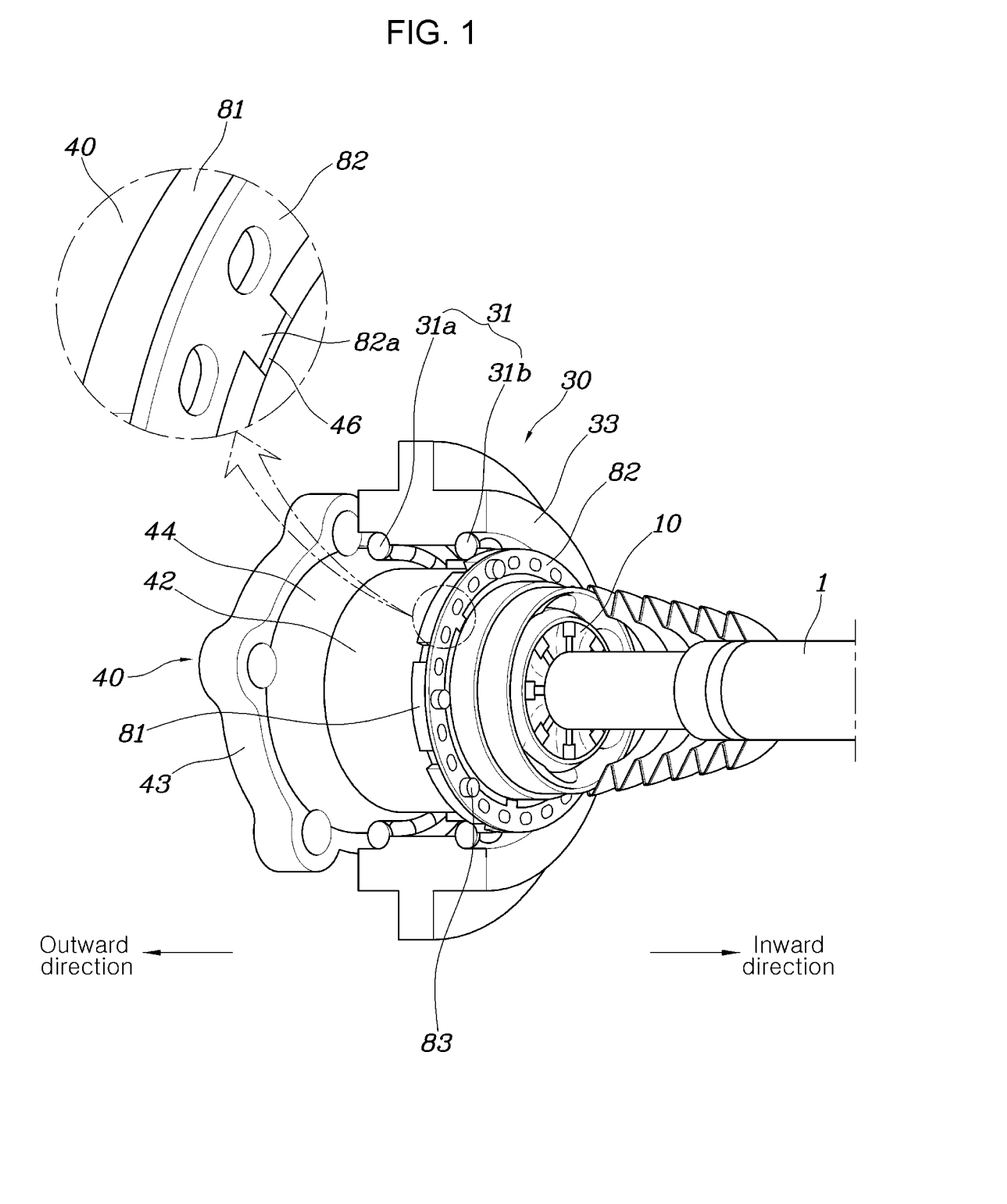
FIG. 1 is a perspective view illustrating a constant velocity joint assembly integrated with a wheel hub device according to an exemplary embodiment of the present invention.
Figure 2:
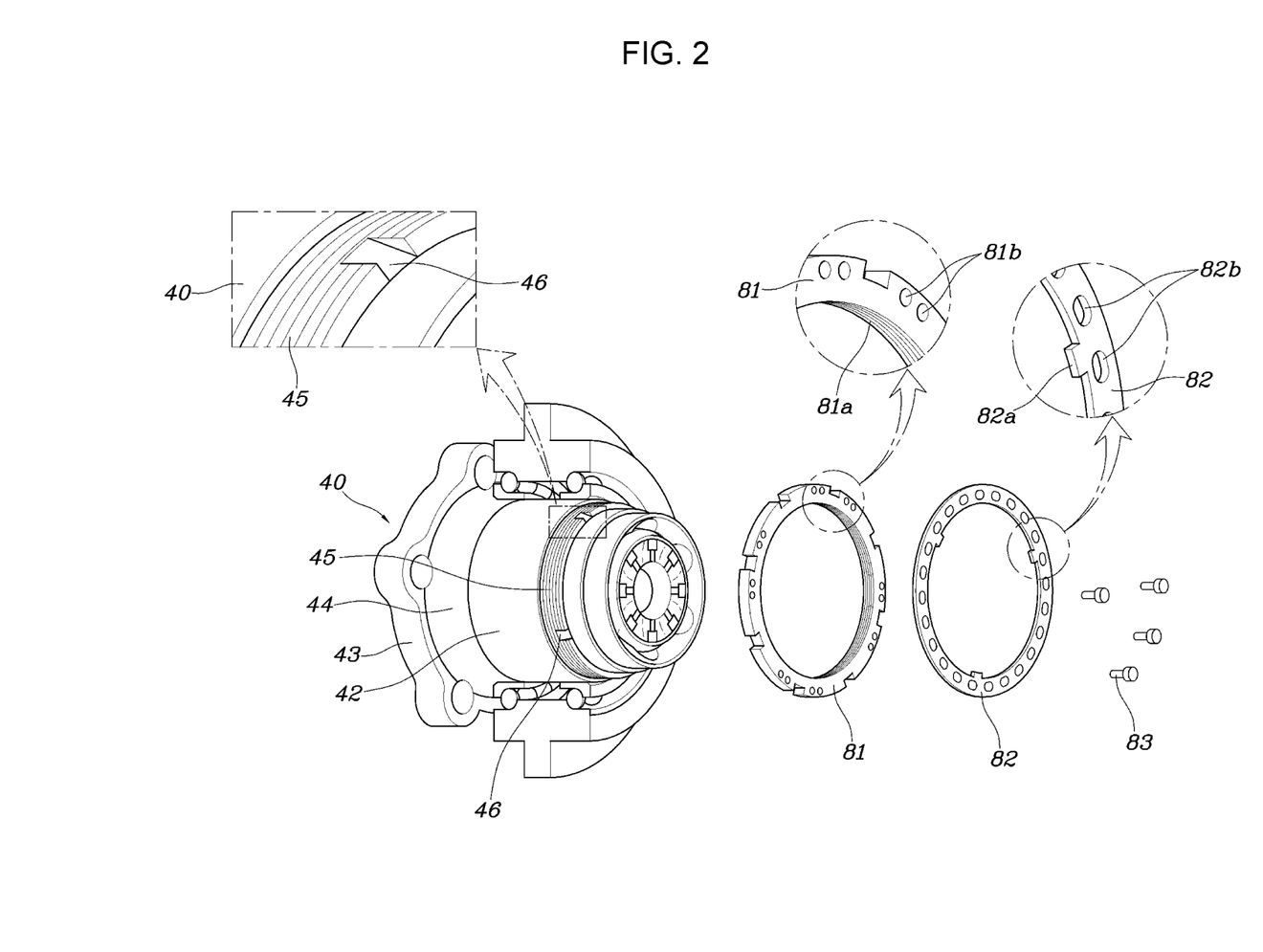
FIG. 2 is a view illustrating the constant velocity joint assembly of FIG. 1, with a lock nut and a lock ring disconnected.
Figure 3:
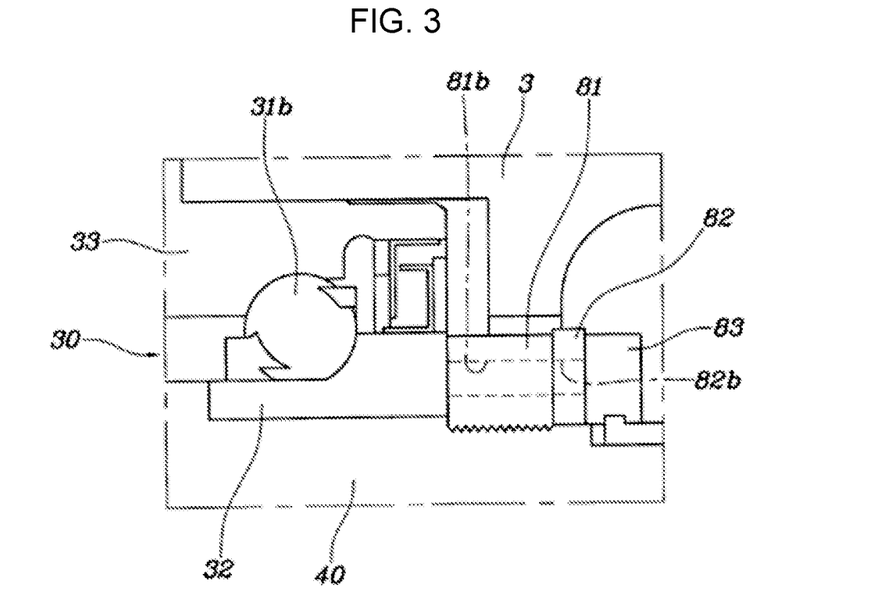
FIG. 3 is an enlarged view of a section where the lock nut and the lock ring are coupled.

Furthermore, the constant velocity joint assembly also includes a lock nut 81, which applies a preload to the circumferentially-internal ring 32 while being screwed onto the hub housing 40, a lock ring 82, which is fixedly coupled to the hub housing 40 while abutting against a side surface of the lock nut 81, and a plurality of bolts 83, which is fastened to the lock nut 81 through the lock ring 82.

That is, the hub housing 40 is outwardly circumferentially provided on one side thereof with a first screw portion 45 (e.g. a female screw part), around which a plurality of key grooves 46 is formed.

The lock nut 81 has a second screw portion 81a (e.g. a male screw part) on an internal circumferential surface thereof, and a plurality of through-holes 81b, which is circumferentially provided.

The lock ring 82 has a plurality of protrusions 82a on an internal circumferential surface thereof, and a plurality of through-holes 82b, which is circumferentially provided.

Thus, during assembly, the lock nut 81 is screw-coupled around the hub housing 40 using the first and second screw portions 45 and 81a of the hub housing 40 and the lock nut 81 such that the circumferentially-internal ring 32 of the bearing 30 is not only properly positioned, but also applied with a proper level of preload by regulating the fastening force of the lock nut 81. After the lock nut 81 is fastened, the lock ring 82 is assembled such that the protrusions 82a of the lock ring 82 are fitted into the key grooves 46 of the hub housing 40. Finally, the bolts 83 are bolted into the through-holes 81b of the lock nut 81 through the through-holes 82b of the lock ring 82, completing the assembly of the bearing 30.

Figure 4:
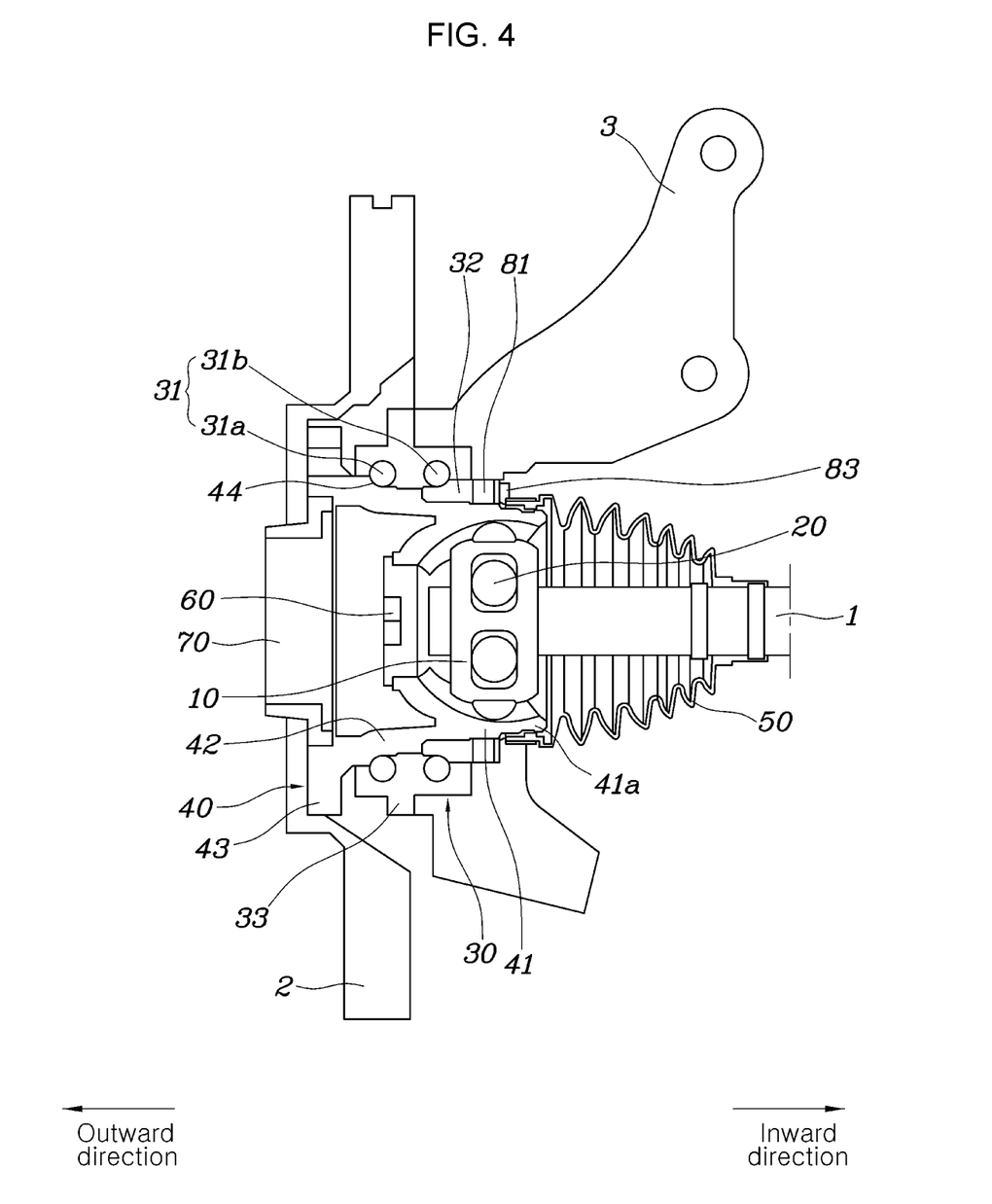
FIG. 4 is a cross-sectional view of the constant velocity joint assembly of FIG. 1.

The exemplary embodiment of the present invention is characterized in that the hub portion 41 is positioned within the whole length A of the hub housing 40, and the center Z of the internal race 10 is positioned in the hub portion 41.

Here, the whole length A of the hub housing 40 means the whole length of the hub housing in the horizontal direction of a vehicle.

Within the whole length A of the hub housing 40, at least the bearing ball 31 including two rows of external and internal balls 31a and 31b, the lock nut 81 and the boot 50 are disposed.

The conventional structure in which the external race of the constant velocity joint and the wheel hub device are separately manufactured and coupled by the spline and hub nut is disadvantageous in terms of packaging of the constant velocity joint assembly, because the center of the internal race is positioned on the right side out of the whole length of the hub housing so that the whole size of the assembly is increased.

In contrast, according to an exemplary embodiment of the present invention, the center Z of the internal race 10 is positioned within the whole length A of the hub housing 40 so that the size of the assembly is substantially reduced in the horizontal direction of a vehicle, being advantageous in packaging the assembly.

Figure 5:
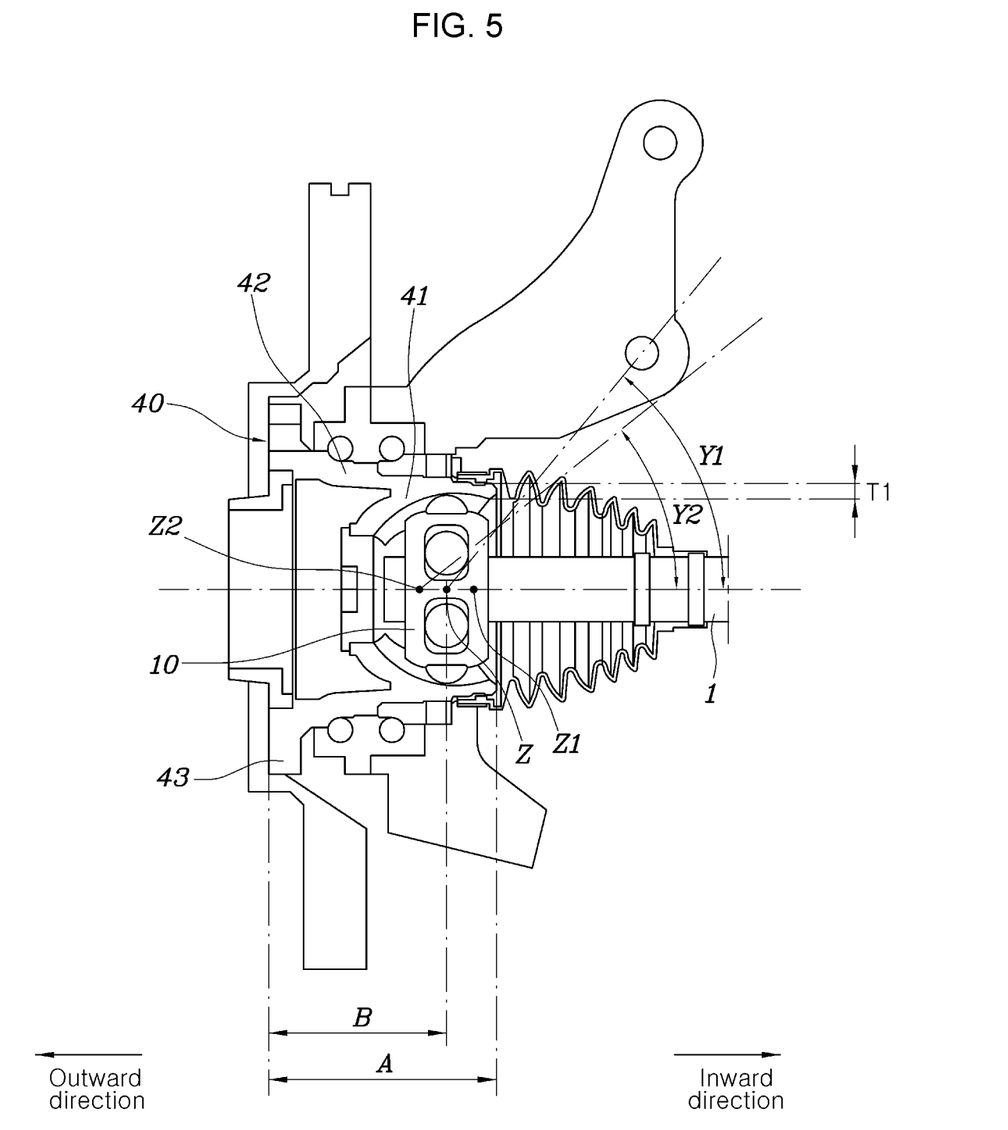
FIG. 5, FIG. 6 and FIG. 7 are views illustrating a detailed configuration of the constant velocity joint assembly.

As illustrated in FIG. 5, the present invention is characterized in that a correlation between a whole length A of the hub housing 40 and a central length B of the internal race 10 satisfies a condition of '$1.25 \leq A/B \leq 1.4$'.

Here, the central distance B means a length from a lateral end portion of the flange portion 43 of the hub housing 40 to the center Z of the internal race 10.

In a case where the whole length A of the hub housing 40 is a fixed value, if $A/B<1.25$, the central length B of the internal race 10 increases relative to the state shown in FIG. 5, i.e., the center Z of the internal race 10 moves to a position Z1 in the direction toward the internal to a vehicle.

If the central length B of the internal race 10 increases with the movement of the center Z of the internal race 10 toward the position Z1, the spoke thickness T1 of the hub portion 41 is reduced relative to the state shown in FIG. 5, reducing the strength of the hub housing 40.

If the spoke thickness T1 of the hub portion 41 is arbitrarily increased for improving the strength of the hub housing, an external diameter of the hub housing 40, as well as the size of the bearing 30, increases, which is disadvantageous in reducing the weight of the assembly.

In a case where the whole length A of the hub housing 40 is a fixed value, if $A/B>1.4$, the central length B of the internal race 10 decreases relative to the state shown in FIG. 5, i.e., the center Z of the internal race 10 moves to a position Z2 in the direction toward the outside of a vehicle.

If the central length B of the internal race 10 decreases with the movement of the center Z of the internal race 10 toward the position Z2, an allowable rotation angle of the driveshaft 1 decreases from Y1 to Y2, which adversely affects the steering performance, leading to a reduction in minimum turning radius and thus degrading the steering performance.

Thus, in the exemplary embodiment of the present invention, the configuration satisfying the condition of '$1.25 \leq A/B \leq 1.4$' has the effects of securing a sufficient spoke thickness T1 of the hub portion 41 and thus maintaining the strength of the hub housing 40, of maintaining a sufficient rotation angle of the driveshaft 1 and thus improving steering performance.

Figure 6:
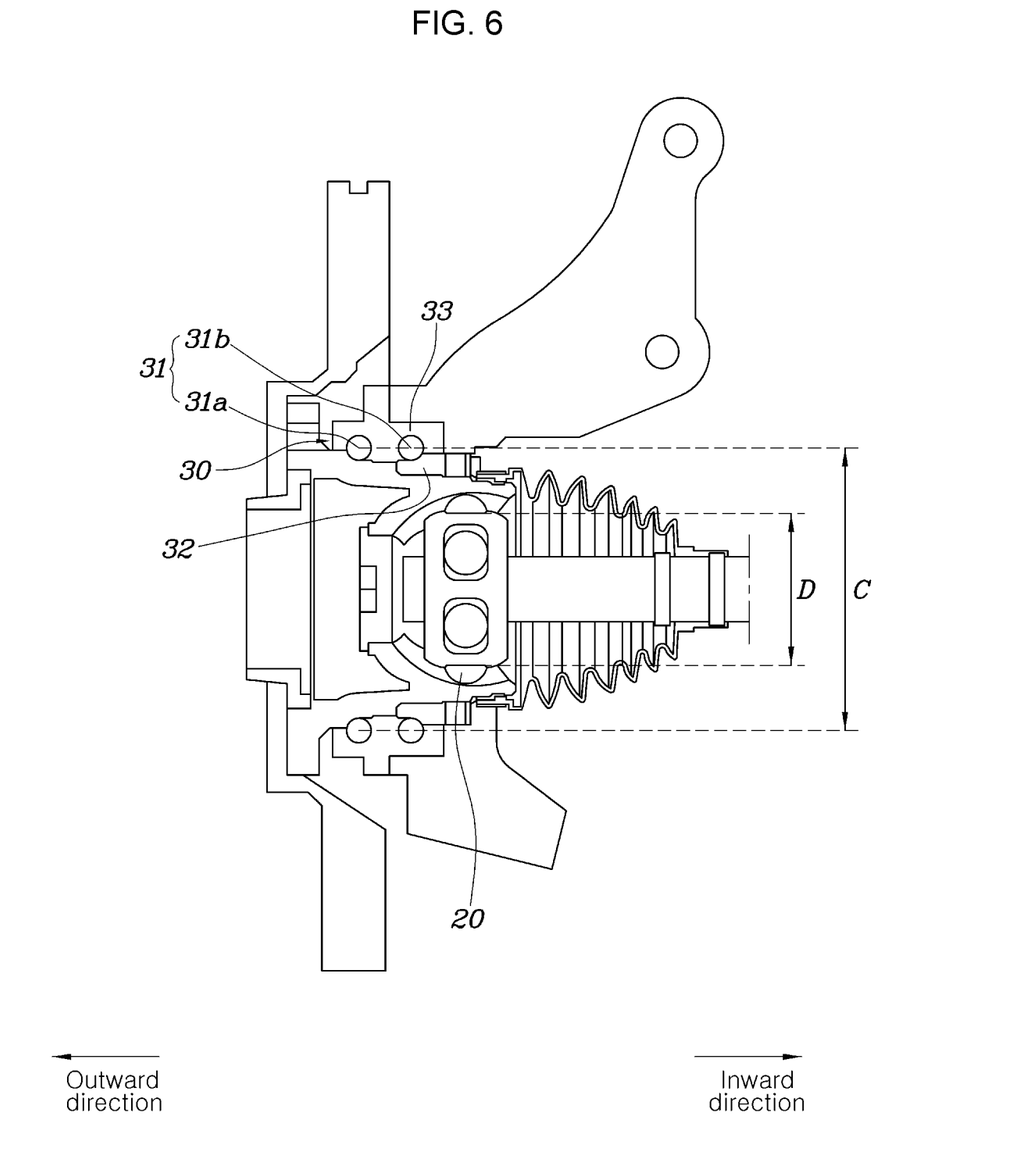

Furthermore, as illustrated in FIG. 6, the present invention is characterized in that a correlation between a pitch circle diameter (PDC) C of the bearing ball 31 and a pitch circle diameter D of the joint balls 20 satisfies a condition of '$1.7 \leq C/D \leq 1.9$'.

Here, the PCD C of the bearing ball 31 means a diameter of a pitch circle of the bearing ball 31, and the PCDs of the external and internal balls 31a and 31b are the same.

The PCD D of the joint balls 20 means a diameter of a pitch circle of the joint balls 20.

The PCD D of the joint balls 20 is a fixed value as a standard specification for strength, which is required for a vehicle.

Thus, in a case where the PCD D of the joint balls 20 is a fixed value, if $C/D<1.7$, the PCD C of the bearing balls 20 decreases, i.e. A. A distance between the joint ball 20 and the bearing ball 31 decreases.

If the distance between the joint ball 20 and the bearing ball 31 decreases as the PCD C of the bearing ball 31 decreases, to secure a mounting space of the bearing ball 31, it is required to change a design to reduce the size of the bearing ball 31 and the thickness of the circumferentially-internal ring 32, resulting in a reduction in the strength and lifecycle of the bearing 30.

Furthermore, in a case where the PCD D of the joint balls 20 is a fixed value, if $C/D>1.9$, the PCD C of the bearing balls 20 increases, i.e. A. A distance between the joint ball 20 and the bearing ball 31 increases.

If the distance between the joint ball 20 and the bearing ball 31 increases as the PCD C of the bearing ball 31 increases, although the mounting space of the bearing ball 31 is sufficiently secured, the size and weight of the circumferentially-external ring 33 increase accordingly, and thus the interference between the circumferentially-external ring 33 and the peripheral parts (e.g., the knuckle carrier, the disk, or a caliper) occurs, degrading the durability of the assembly.

Thus, according to the exemplary embodiment of the present invention, the configuration satisfying the condition of '$1.7 \leq C/D \leq 1.9$' has the effects of securing a sufficient mounting space of the bearing ball 31 and sufficient strength of the bearing 30, and of providing sufficient durability through prevention of interference with peripheral parts.

Figure 7:
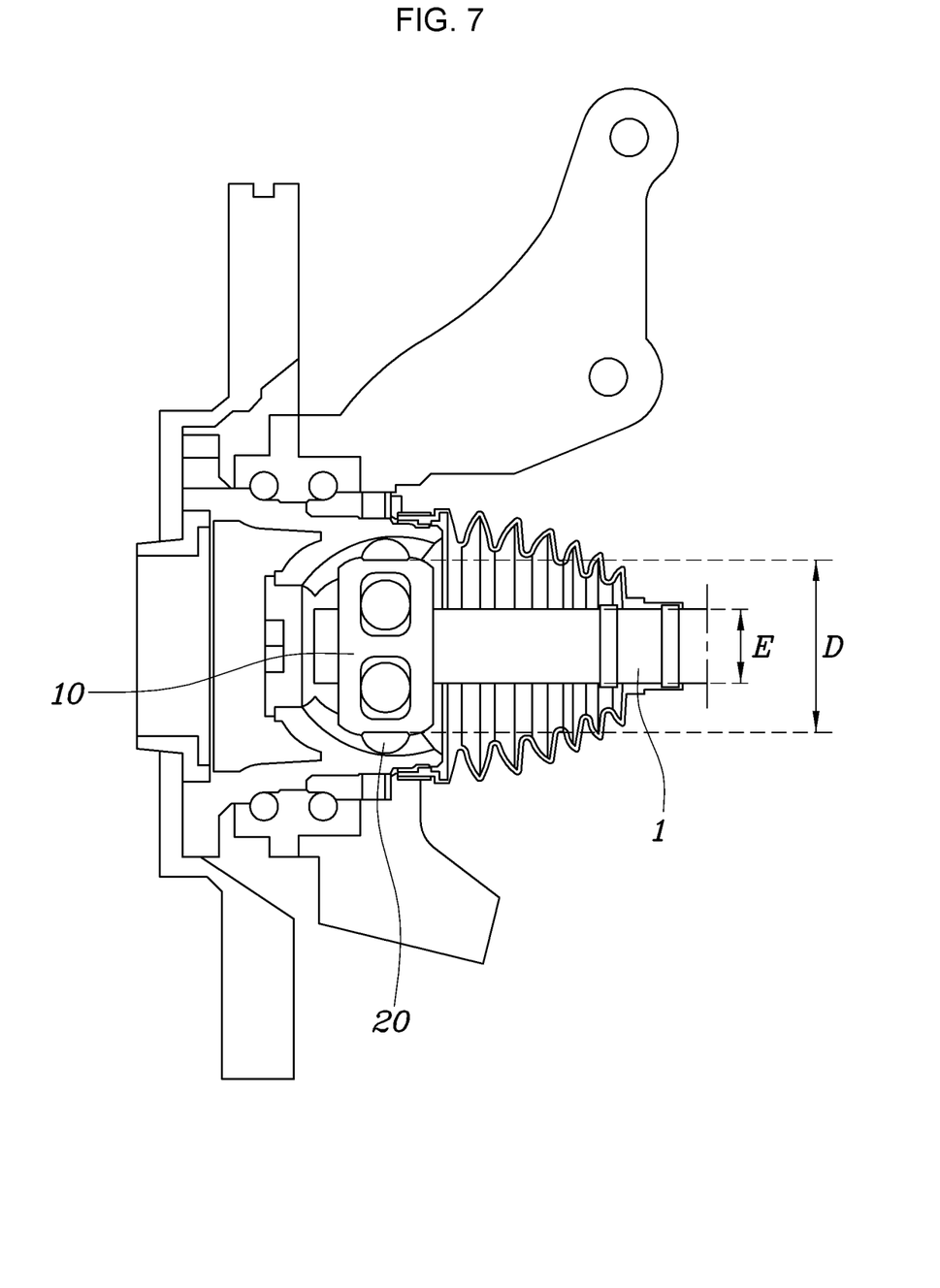

Furthermore, as illustrated in FIG. 7, the present invention is characterized in that a correlation between the PCD D of the joint balls 20 and a diameter E of the driveshaft 1 satisfies a condition of '$2.15 \leq D/E \leq 2.35$'.

The PCD D of the joint balls 20 is a fixed value as a standard specification for strength, which is required for a vehicle.

Thus, in a case where the PCD D of the joint balls 20 is a fixed value, if $D/E<2.15$, the diameter E of the driveshaft 1 increases.

If the diameter E of the driveshaft 1 increases as the PCD D of the joint balls 20 is fixed, although the strength of the driveshaft 1 increases, it is required to change a design to reduce a sectional thickness of the internal race 10, so that the constant velocity joint assembly cannot obtain an allowable strength thereof.

Furthermore, in a case where the PCD D of the joint balls 20 is a fixed value, if $D/E>2.35$, the diameter E of the driveshaft 1 decreases. In the instant case, the strength of the driveshaft 1 itself decreases, so that the constant velocity joint assembly cannot obtain an allowable strength thereof Thus, according to the exemplary embodiment of the present invention, the configuration satisfying the condition of '$2.15 \leq D/E \leq 2.35$' has the effects of satisfying the strength of the driveshaft 1 itself and the allowable strength of the constant velocity joint assembly.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A constant velocity joint assembly integrated with a wheel hub device, the assembly comprising:
    an internal race coupled to an end portion of a driveshaft;
    a plurality of joint balls rotatably mounted in the internal race;
    a hub housing accommodating and being coupled to the internal race holding the joint balls therein, wherein the hub housing includes a bearing mounted to an external circumferential surface of the hub housing, the hub housing provided to perform roles of both an external race and the wheel hub device, and wherein the bearing includes an internal ring, an external ring and bearing balls,
        wherein a knuckle carrier is fixed to the external ring of the bearing,
        wherein rows for supporting the bearing balls are accommodated on the hub housing and the internal ring of the hub bearing, respectively,
        wherein the bearing balls are mounted onto the external ring and in the rows of the hub housing and the internal ring, and
        wherein a lock nut is coupled to the hub housing and engaged to the internal ring to apply a preload to the internal ring,
    a lock ring fixedly coupled to the hub housing while abutting against a side surface of the lock nut; and
    a plurality of fasteners connected onto the lock nut through the lock ring.

2. The constant velocity joint assembly according to claim 1, wherein the hub housing includes:
    a circular hub portion to which the joint balls of the internal race are mounted, wherein the circular hub portion supports the internal ring; and
    a housing portion supporting the external ring.

3. The constant velocity joint assembly according to claim 2, wherein the bearing balls include:
    an external ball and an internal ball provided on an external circumferential surface of the housing portion;
    the internal ring supporting and holding the internal ball; and
    the external ring slidably supporting the external ball and the internal ball.

4. The constant velocity joint assembly according to claim 3, wherein the external ball is held by a ball support formed with the housing portion.

5. The constant velocity joint assembly according to claim 3, wherein a hub cap is mounted to couple the circular hub portion and the internal race.

6. The constant velocity joint assembly according to claim 1, wherein the hub housing is provided on an outer circumferential side with a first screw portion around which a plurality of key grooves is formed.

7. The constant velocity joint assembly according to claim 6, wherein the lock nut has a second screw portion on an internal circumferential surface thereof, and a plurality of through-holes and wherein the lock nut is coupled around the hub housing using the first and second screw portions of the lock nut and the hub housing so that the internal ring of the bearing is applied with the preload by regulating a fastening force of the lock nut with the internal ring.

8. The constant velocity joint assembly according to claim 7, wherein the lock ring includes a plurality of protrusions on an internal circumferential surface thereof, and a plurality of through-holes, and wherein the protrusions of the lock ring are fitted into the key grooves formed in the hub housing.

9. The constant velocity joint assembly according to claim 8, wherein fasteners are configured to connect the lock nut and the lock ring into the through-holes of the lock nut and the through-holes of the lock ring.

10. The constant velocity joint assembly according to claim 1, wherein the hub housing includes a circular hub portion having grooves into which the joint balls are inserted, the circular hub portion being disposed within a whole length (A) of the hub housing,
- wherein at least the rows of the ball bearings, the lock nut, and a boot are disposed within the whole length (A) of the hub housing,
- wherein a center of the internal race is disposed in the circular hub portion, and
- wherein a correlation between the whole length (A) of the hub housing and a central length (B) of the internal race satisfies a condition of $1.25 \leq A/B \leq 1.4$.

11. The constant velocity joint assembly according to claim 1, wherein a correlation between a pitch circle diameter (C) of the bearing balls and a pitch circle diameter (D) of the joint balls satisfies a condition of $1.7 \leq C/D \leq 1.9$.

12. The constant velocity joint assembly according to claim 1, wherein a correlation between a pitch circle diameter (D) of the joint balls and a diameter (E) of the driveshaft satisfies a condition of $2.15 \leq D/E \leq 2.35$.

* * * * *